(12) United States Patent
Anzawa et al.

(10) Patent No.: US 11,639,695 B2
(45) Date of Patent: May 2, 2023

(54) MISFIRE DETECTION DEVICE AND METHOD FOR INTERNAL COMBUSTION ENGINE

(71) Applicant: TOYOTA JIDOSHA KABUSHIKI KAISHA, Toyota (JP)

(72) Inventors: Takumi Anzawa, Okazaki (JP); Akihiro Katayama, Toyota (JP); Yuki Ikejiri, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 17/482,608

(22) Filed: Sep. 23, 2021

(65) Prior Publication Data

US 2022/0099041 A1  Mar. 31, 2022

(30) Foreign Application Priority Data

Sep. 29, 2020  (JP) .............................. JP2020-162970

(51) Int. Cl.
  *F02D 41/14* (2006.01)
  *F02D 41/00* (2006.01)
  *G01M 15/11* (2006.01)
  *F02D 41/02* (2006.01)

(52) U.S. Cl.
  CPC ..... *F02D 41/1498* (2013.01); *F02D 41/0085* (2013.01); *F02D 41/0087* (2013.01); *F02D 41/029* (2013.01); *F02D 41/1475* (2013.01); *G01M 15/11* (2013.01); *F02D 2200/101* (2013.01)

(58) Field of Classification Search
  CPC ............. F02D 41/1498; F02D 41/0085; F02D 41/0087; F02D 41/029; F02D 41/1475; F02D 2200/101; G01M 15/11
  See application file for complete search history.

(56) References Cited

U.S. PATENT DOCUMENTS

| | | | |
|---|---|---|---|
| 5,309,756 A | 5/1994 | Osawa et al. | |
| 6,634,220 B1 | 10/2003 | Amano | |
| 10,060,376 B2 * | 8/2018 | Gallhuber | G01L 23/225 |
| 2015/0075508 A1 * | 3/2015 | Wada | G01M 15/11 |
| | | | 123/704 |

(Continued)

FOREIGN PATENT DOCUMENTS

| | | |
|---|---|---|
| JP | 5-60004 A | 3/1993 |
| JP | 2001-107799 A | 4/2001 |

*Primary Examiner* — Joseph J Dallo
(74) *Attorney, Agent, or Firm* — Oblon, McClelland, Maier & Neustadt, L.L.P.

(57) ABSTRACT

A misfire detection device for an internal combustion engine is configured to execute: a deactivating process that deactivates combustion control for air-fuel mixture in one or some of cylinders; a provisional determination process that uses a detection value of a sensor to output a logical value indicating whether a misfire has occurred; a provisional determination counting process that counts a number of times a specific one of the logical value output by the provisional determination counting process has been output; and an official determination process that makes an official determination of whether the misfire has occurred using, as an input, the number of times counted by the provisional determination counting process during a specific period.

11 Claims, 7 Drawing Sheets

(56) References Cited

U.S. PATENT DOCUMENTS

| | | | |
|---|---|---|---|
| 2016/0047353 A1* | 2/2016 | Huberts | F02P 17/12 |
| | | | 324/380 |
| 2016/0053701 A1* | 2/2016 | Iwase | F02D 41/1498 |
| | | | 123/673 |
| 2017/0058820 A1* | 3/2017 | Sugimoto | F02D 41/221 |
| 2017/0267239 A1* | 9/2017 | Nakoji | B60W 10/06 |
| 2017/0268453 A1* | 9/2017 | Sugimoto | F02D 41/1498 |
| 2018/0340863 A1* | 11/2018 | Miura | F02D 41/0087 |
| 2018/0347490 A1* | 12/2018 | Kuroiwa | F02D 17/04 |
| 2019/0093532 A1* | 3/2019 | Myojo | F02D 41/1439 |
| 2020/0309055 A1* | 10/2020 | Anzawa | F02D 41/2409 |

\* cited by examiner

MISFIRE DETECTION DEVICE AND METHOD FOR INTERNAL COMBUSTION ENGINE

FIELD

The present disclosure relates to a misfire detection device and method for an internal combustion engine.

DESCRIPTION OF RELATED ART

Japanese Laid-Open Patent Publication No. 2001-107799 discloses an example of a misfire detection device. The device makes a provisional determination of whether a misfire has occurred by comparing the value of a rotation fluctuation of the crankshaft with a threshold value. The device makes an official determination of whether a misfire has occurred using the number of times a misfire is provisionally determined as having occurred when the cumulative number of rotations of the internal combustion engine becomes a specific value.

The inventors examined supplying unburned fuel and oxygen into exhaust gas by deactivating combustion control only in one or some cylinders and increasing the air-fuel ratio of the remaining cylinders to be richer than the stoichiometric air-fuel ratio in order to execute a regenerating process for the aftertreatment device when the shaft torque of the internal combustion engine is not zero. However, in this case, the number of deactivations of combustion control varies a misfire ratio in a case in which the official determination is made to determine that a misfire has occurred using the number of provisional determinations when the above-described cumulative number becomes the specific value.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspect 1: A misfire detection device for an internal combustion engine is provided. The internal combustion engine includes a sensor and cylinders. The misfire detection device is configured to execute: a deactivating process that deactivates combustion control for air-fuel mixture in one or some of the cylinders; a provisional determination process that uses a detection value of the sensor to output a logical value indicating whether a misfire has occurred; a provisional determination counting process that counts a number of times a specific one of the logical value output by the provisional determination counting process has been output; and an official determination process that makes an official determination of whether the misfire has occurred using, as an input, the number of times counted by the provisional determination counting process during a specific period. A length of the specific period is defined by a number of rotations of a crankshaft of the internal combustion engine. The official determination process includes a process that makes the official determination that the misfire has occurred even in a case where a frequency at which the provisional determination of the misfire has been made in the specific period is lower when the deactivating process is executed in the specific period than when the deactivating process is not executed in the specific period. The frequency at which the provisional determination of the misfire has been made in the specific period is a value obtained by dividing a number of times the provisional determination has been made by the number of rotations of the crankshaft in the specific period.

The misfire detection device makes the official determination that a misfire has occurred at a specific frequency at which the provisional determination of the misfire is made in the specific period. In this case, the official determination that the misfire has occurred is no longer made if the frequency of the provisional determination of the misfire exceeds the number of times the combustion control has been executed to a larger extent when the deactivating process is executed a large number of times than when the deactivating process is executed a small number of times. Thus, in the above-described configuration, the misfire detection device makes the official determination that the misfire has occurred even in the case where the frequency at which the provisional determination of the misfire has been made in the specific period is lower when the deactivating process is executed in the specific period than when the deactivating process is not executed in the specific period. This prevents situations in which the frequency of the provisional determination of the misfire relative to the number of times the combustion control has been executed during the execution of the official determination is excessive or deficient relative to a frequency at which the official determination that the misfire has occurred should be made.

Aspect 2: In the misfire detection device according to Aspect 1, the official determination process includes a process that makes the official determination that the misfire has occurred even in the case where the frequency at which the provisional determination of the misfire has been made in the specific period is lower when the deactivating process is executed in the specific period a large number of times than when the deactivating process is executed in the specific period a small number of times.

In the above-described configuration, the misfire detection device refers to not only whether the deactivating process is executed but also the number of executions of the deactivating process to define a frequency at which the provisional determination of a misfire has been made in the specific period in which the official determination should be made. Thus, as compared with when the frequency is defined only in reference to whether the deactivating process is executed, this configuration further prevents situations in which the frequency of the provisional determination of the misfire relative to the number of times the combustion control has been executed during the execution of the official determination is excessive or deficient relative to a frequency at which the official determination that the misfire has occurred should be made.

Aspect 3: In the misfire detection device according to Aspect 1 or 2, the official determination process includes, as an input, the number of times counted by the provisional determination counting process during the specific period and makes the official determination that the misfire has occurred when the number of times the provisional determination has been made is greater than or equal to a determination threshold value. The official determination process includes an extending process that sets the specific period to be longer when the deactivating process is executed than when the deactivating process is not executed.

In the above-described configuration, the misfire detection device makes the official determination that the misfire has occurred when the number of provisional determinations in the provisional determination is greater than or equal to the determination threshold value. Thus, during the specific period or when the determination threshold value is a fixed value, the official determination that the misfire has occurred is not made if the ratio of the provisional determination of the misfire to the number of executions of combustion control is not greater as the number of executions of deactivating processes becomes larger. In the above-described configuration, the specific period is set to be longer when the deactivating process is executed than when the deactivating process is not executed. This prevents situations in which the frequency of the provisional determination of the misfire relative to the number of times the combustion control has been executed during the execution of the official determination is excessive or deficient relative to a frequency at which the official determination that the misfire has occurred should be made.

Aspect 4: In the misfire detection device according to Aspect 3, the official determination process includes a validity counting process that monitors whether the combustion control is executed in an occurrence cycle of a compression top dead center and counts a number of times the combustion control is executed when the combustion control is executed. The extending process includes a specific period setting process that sets the specific period to a period in which a valid number of times reaches a given value, the valid number of times referring to the number of times counted by the validity counting process.

In the above-described configuration, the specific period is set to the period in which the valid number of times reaches the given value. This allows the specific period to be longer when the deactivating process is executed a large number of times than when the deactivating process is executed a small number of times.

Aspect 5: In the misfire detection device according to Aspect 3, the official determination process includes a deactivation counting process that monitors whether the deactivating process is executed in an occurrence cycle of a compression top dead center and counts a number of times the deactivating process has been executed. The extending process increases an extension amount of the specific period as the number of times counted by the deactivation counting process increases.

The extending process increases the extension amount of the specific period as the number of times counted by the deactivation counting process increases. Thus, as compared with when the specific period is binarily defined in reference to whether the deactivating process is executed, this configuration further prevents situations in which the frequency of the provisional determination of the misfire relative to the number of times the combustion control has been executed during the execution of the official determination is excessive or deficient relative to a frequency at which the official determination that the misfire has occurred should be made.

Aspect 6: In the misfire detection device according to Aspect 1 or 2, the official determination process includes, as an input, the number of times counted by the provisional determination counting process during the specific period and makes the official determination that the misfire has occurred when the number of times the provisional determination has been made is greater than or equal to a determination threshold value. The official determination process includes a setting process that sets the determination threshold value to be smaller when the deactivating process is executed in the specific period than when the deactivating process is not executed in the specific period.

In the above-described configuration, the misfire detection device makes the official determination that the misfire has occurred when the number of provisional determinations in the provisional determination is greater than or equal to the determination threshold value. Thus, during the specific period or when the determination threshold value is a fixed value, the official determination that the misfire has occurred is not made if the ratio of the provisional determination of the misfire to the number of executions of combustion control is not greater as the number of executions of deactivating processes becomes larger. In the above-described configuration, the misfire detection device sets the determination threshold value to be smaller when the deactivating process is executed than when the deactivating process is not executed. This prevents situations in which the frequency of the provisional determination of the misfire relative to the number of times the combustion control has been executed during the execution of the official determination is excessive or deficient relative to a frequency at which the official determination that the misfire has occurred should be made.

Aspect 7: In the misfire detection device according to Aspect 6, the official determination process includes a deactivation counting process that monitors whether the deactivating process is executed in an occurrence cycle of a compression top dead center and counts a number of times the deactivating process has been executed. The setting process includes a result of counting the deactivation counting process as an input and decreases the determination threshold value as the number of times the deactivating process has been executed becomes larger.

In the above-described configuration, the misfire detection device sets the determination threshold value to be smaller as the number of executions of the deactivating process becomes larger. Thus, as compared with when the determination threshold value is binarily set in reference to whether the deactivating process is executed, this configuration further prevents situations in which the frequency of the provisional determination of the misfire relative to the number of times the combustion control has been executed during the execution of the official determination is excessive or deficient relative to a frequency at which the official determination that the misfire has occurred should be made.

Aspect 8: In the misfire detection device according to Aspect 1 or 2, the official determination process includes, as an input, the number of times counted by the provisional determination counting process during the specific period and makes the official determination that the misfire has occurred when the number of times the provisional determination has been made is greater than or equal to a determination threshold value. The official determination process includes a correcting process that corrects the number of times counted by the provisional determination counting process such that the number of times the provisional determination of the misfire has been made increases when the deactivating process is executed in the specific period.

In the above-described configuration, the misfire detection device makes the official determination that the misfire has occurred when the number of provisional determinations in the provisional determination is greater than or equal to the determination threshold value. Thus, during the specific period and/or when the determination threshold value is a fixed value, the official determination that the misfire has occurred is not made if the ratio of the provisional determination of the misfire to the number of executions of combustion control is not greater as the number of executions of deactivating processes becomes larger. In the above-described configuration, the misfire detection device corrects the number of times counted by the provisional determination counting process such that the number of provisional determinations of the misfire increases when the deactivating process is executed. This prevents situations in which the frequency of the provisional determination of the misfire relative to the number of times the combustion control has been executed during the execution of the official determination is excessive or deficient relative to a frequency at which the official determination that the misfire has occurred should be made.

Aspect 9: In the misfire detection device according to Aspect 8, the official determination process includes a deactivation counting process that monitors whether the deactivating process is executed in an occurrence cycle of a compression top dead center and counts a number of times the deactivating process has been executed. The correcting process corrects the number of times counted by the provisional determination counting process such that the number of times the provisional determination of the misfire has been made increases as the number of times counted by the deactivation counting process increases.

In the above-described configuration, the misfire detection device corrects the number of times counted by the provisional determination counting process such that the number of provisional determinations of the misfire increases as the number of executions of the deactivating process increases. Thus, as compared with when the determination threshold value is binarily set in reference to whether the deactivating process is executed, this configuration further prevents situations in which the frequency of the provisional determination of the misfire relative to the number of times the combustion control has been executed during the execution of the official determination is excessive or deficient relative to a frequency at which the official determination that the misfire has occurred should be made.

Aspect 10: In the misfire detection device according to any one of Aspects 2, 4, 5, 7, and 9, the internal combustion engine includes a filter that traps particulate matter in exhaust gas in an exhaust passage. The misfire detection device is configured to execute: a regenerating process including the deactivating process and a process that sets an air-fuel ratio in a cylinder that differs from the one or some of the cylinders to be richer than a stoichiometric air-fuel ratio when an amount of the particulate matter trapped by the filter is greater than or equal to a specific amount; and a process that suspends the regenerating process in a case in which a specific condition is not satisfied after starting executing the regenerating process.

In the above-described configuration, there is a possibility that the regenerating process is suspended. Thus, the number of executions of the deactivating process during the specific period varies depending on situations. Accordingly, it is particularly effective to count and use the number of executions of the combustion control and the number of executions of the deactivating process.

Aspect 11: A misfire detection method for an internal combustion engine is provided. The internal combustion engine includes a sensor and cylinders. The method includes: a deactivating process that deactivates combustion control for air-fuel mixture in one or some of the cylinders; a provisional determination process that uses a detection value of the sensor to output a logical value indicating whether a misfire has occurred; a provisional determination counting process that counts a number of times a specific one of the logical value output by the provisional determination counting process has been output; and an official determination process that makes an official determination of whether the misfire has occurred using, as an input, the number of times counted by the provisional determination counting process during a specific period. A length of the specific period is defined by a number of rotations of a crankshaft of the internal combustion engine. The official determination process includes a process that makes the official determination that the misfire has occurred even in a case where a frequency at which the provisional determination of the misfire has been made in the specific period is lower when the deactivating process is executed in the specific period than when the deactivating process is not executed. The frequency at which the provisional determination of the misfire has been made in the specific period is a value obtained by dividing a number of times the provisional determination has been made by the number of rotations of the crankshaft in the specific period.

In the same manner as the misfire detection device according to Aspect 1, this configuration prevents situations in which the frequency of the provisional determination of the misfire relative to the number of times the combustion control has been executed during the execution of the official determination is excessive or deficient relative to a frequency at which the official determination that the misfire has occurred should be made.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment will now be described with reference to the drawings.

Figure 1:
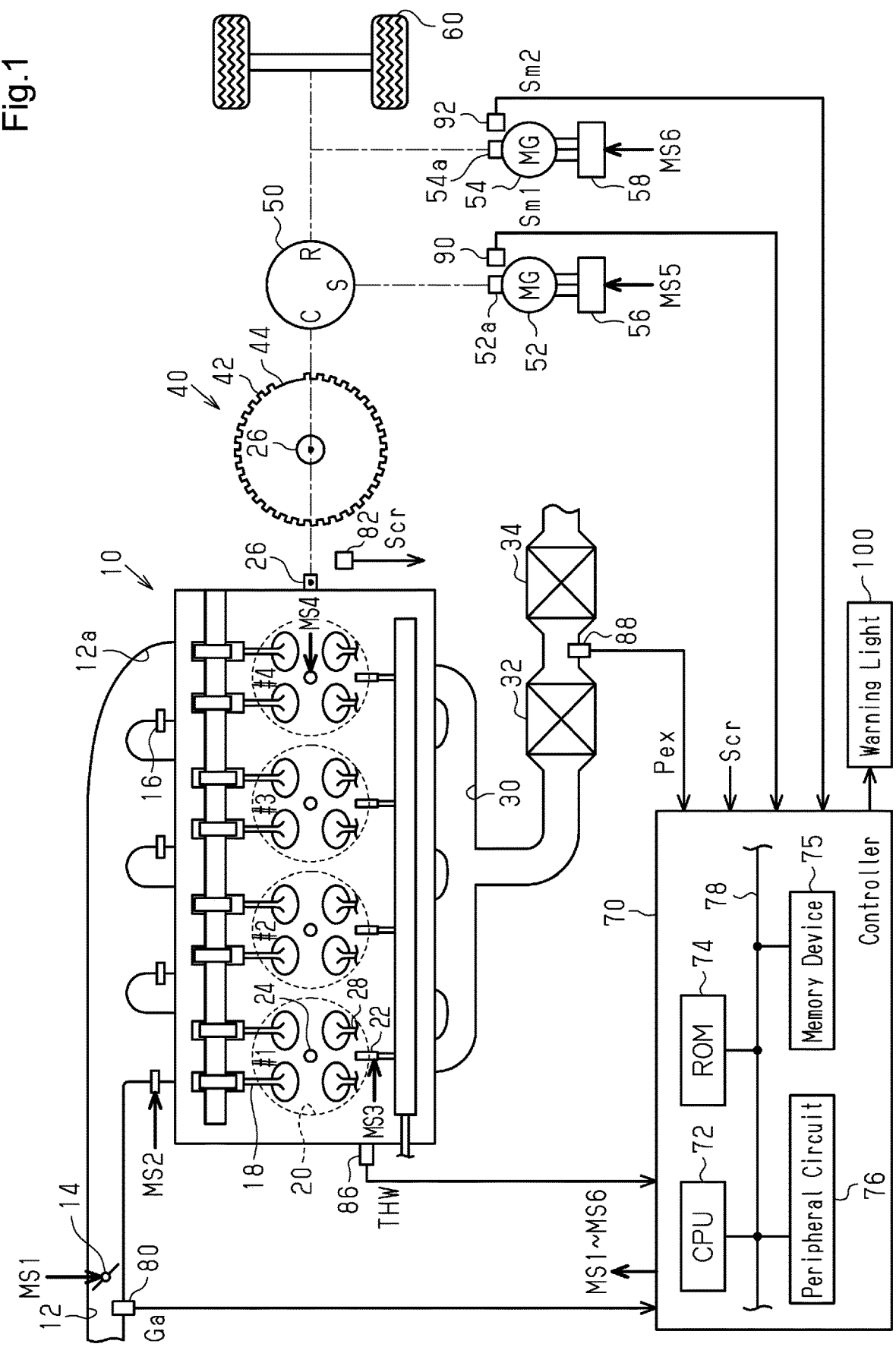
FIG. 1 is a diagram showing the configuration of a driving system and a controller according to a first embodiment.

As shown in FIG. 1, an internal combustion engine 10 includes four cylinders #1 to #4. The internal combustion engine 10 includes an intake passage 12 provided with a throttle valve 14. An intake port 12a at a downstream portion of the intake passage 12 includes port injection valves 16. Each of the port injection valves 16 injects fuel into the intake port 12a. The air drawn into the intake passage 12 and/or the fuel injected from the port injection valves 16 flow into combustion chambers 20 as intake valves 18 open. Fuel is injected into the combustion chambers 20 from direct injection valves 22. The air-fuel mixtures of air and fuel in the combustion chambers 20 are burned by spark discharge of ignition plugs 24. The generated combustion energy is converted into rotation energy of a crankshaft 26.

When exhaust valves 28 open, the air-fuel mixtures burned in the combustion chambers 20 are discharged to an exhaust passage 30 as exhaust gas. The exhaust passage 30 includes a three-way catalyst 32, which has an oxygen storage capacity, and a gasoline particulate filter (GPF) 34. In the GPF 34 of the present embodiment, it is assumed that a three-way catalyst is supported by a filter that traps particulate matter (PM).

A crank rotor 40 with teeth 42 is coupled to the crankshaft 26. The teeth 42 each indicate a rotation angle of the crankshaft 26. While the crank rotor 40 basically includes each tooth 42 at an interval of 10° crank angle (CA), the crank rotor 40 includes an untoothed portion 44. In the untoothed portion 44, the interval between adjacent ones of the teeth 42 is 30° CA. The untoothed portion 44 indicates the reference rotation angle of the crankshaft 26.

The crankshaft 26 is mechanically coupled to a carrier C of a planetary gear mechanism 50, which includes a power split device. A rotary shaft 52a of a first motor generator 52 is mechanically coupled to a sun gear S of the planetary gear mechanism 50. Further, a rotary shaft 54a of a second motor generator 54 and driven wheels 60 are mechanically coupled to a ring gear R of the planetary gear mechanism 50. An inverter 56 applies alternating-current voltage to a terminal of the first motor generator 52. An inverter 58 applies alternating-current voltage to a terminal of the second motor generator 54.

A controller 70 is configured to control the internal combustion engine 10. The controller 70 is configured to operate operation units of the internal combustion engine 10 such as the throttle valve 14, the port injection valves 16, the direct injection valves 22, and the ignition plugs 24 in order to control controlled variables of the internal combustion engine 10 (for example, torque and exhaust component ratio). Further, the controller 70 is configured to control the first motor generator 52. The controller 70 is configured to control the inverter 56 in order to control a rotation speed that is a controlled variable of the first motor generator 52. Further, the controller 70 is configured to control the second motor generator 54. The controller 70 is configured to control the inverter 58 in order to control torque that is a controlled variable of the second motor generator 54. FIG. 1 shows operation signals MS1 to MS6 that correspond to the throttle valve 14, the port injection valves 16, the direct injection valves 22, the ignition plugs 24, the inverter 56, and the inverter 58, respectively. In order to control the controlled variables of the internal combustion engine 10, the controller 70 refers to an intake air amount Ga detected by an air flow meter 80, an output signal Scr of a crank angle sensor 82, a water temperature THW detected by a water temperature sensor 86, a pressure Pex of exhaust gas flowing into the GPF 34. The pressure Pex is detected by an exhaust pressure sensor 88. Further, in order to control the controlled variables of the first motor generator 52 and the second motor generator 54, the controller 70 refers to an output signal Sm1 of a first rotation angle sensor 90 and an output signal Sm2 of a second rotation angle sensor 92. The output signal Sm1 is used to detect the rotation angle of the first motor generator 52. The output signal Sm2 is used to detect the rotation angle of the second motor generator 54. The crank angle sensor 82 corresponds to a sensor. The output signal Scr corresponds to a detection value.

The controller 70 includes a CPU 72 (processor), a ROM 74, a memory device 75, and peripheral circuitry 76. The CPU 72, the ROM 74, the memory device 75, and the peripheral circuitry 76 are capable of communicating with one another via a communication line 78. The peripheral circuitry 76 includes circuits, such as a circuit that generates a clock signal regulating internal operations, a power supply circuit, and a reset circuit. The controller 70 controls the controlled variables by causing the CPU 72 to execute programs stored in the ROM 74. The controller 70 corresponds to a misfire detection device.

Figure 2:
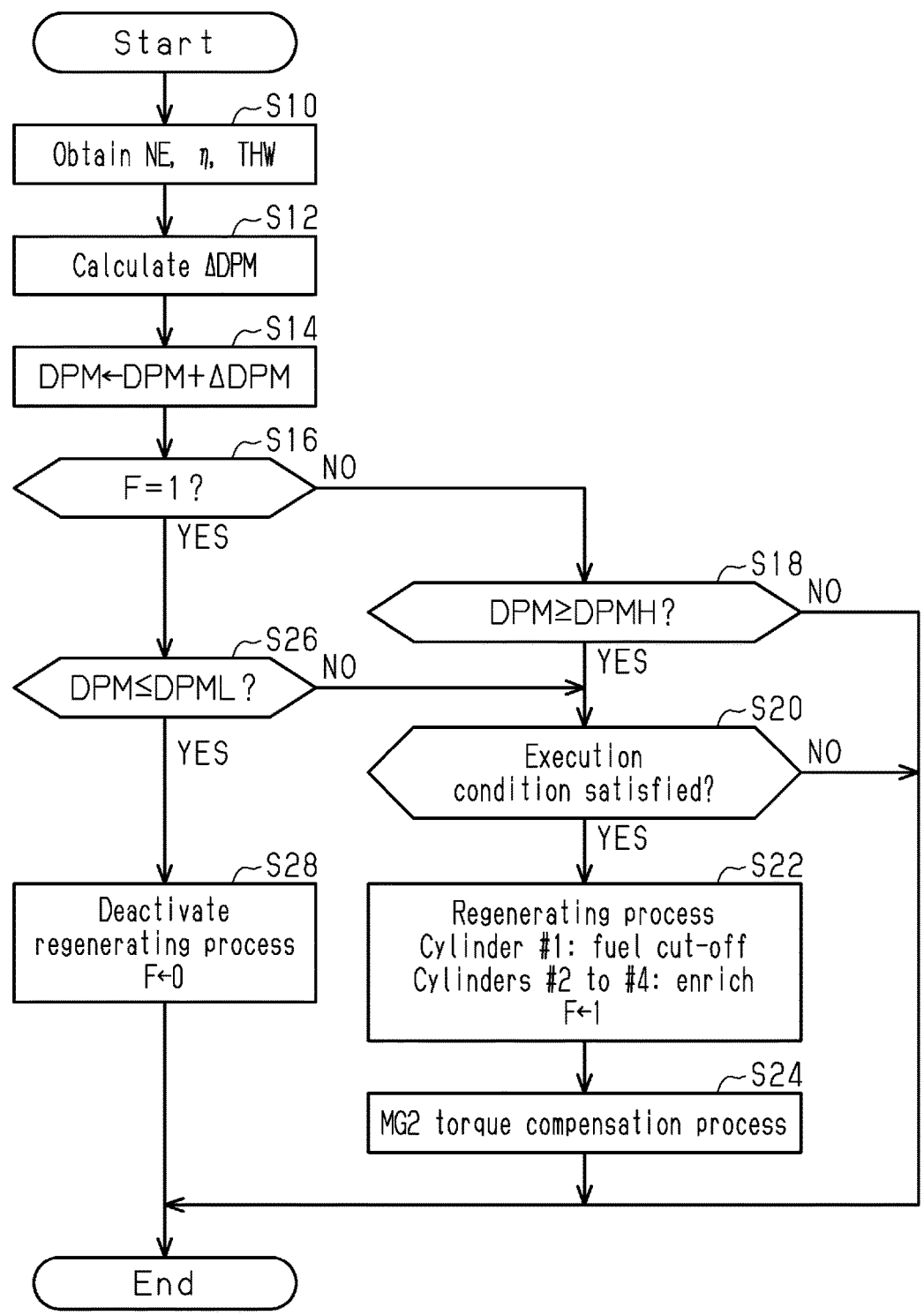
FIG. 2 is a flowchart showing a procedure related to the regenerating process executed by the controller of the embodiment.

FIG. 2 shows a procedure for processes executed by the controller 70 of the present embodiment. The processes shown in FIG. 2 are executed by the CPU 72 repeatedly executing programs stored in the ROM 74, for example, in a specific cycle. In the following description, the number of each step is represented by the letter S followed by a numeral.

In the series of processes shown in FIG. 2, the CPU 72 first obtains the engine speed NE, the charging efficiency η, and the water temperature THW (S10). The rotation speed NE is calculated by the CPU 72 in reference to the output signal Scr. The charging efficiency η is calculated by the CPU 72 in reference to the intake air amount Ga and the rotation speed NE. Next, the CPU 72 uses the rotation speed NE, the charging efficiency η, and the water temperature THW to calculate an update amount ΔDPM of a deposition amount DPM (S12). The deposition amount DPM is the amount of PM trapped by the GPF 34. More specifically, the CPU 72 uses the rotation speed NE, the charging efficiency Ti, and the water temperature THW to calculate the amount of PM in the exhaust gas discharged to the exhaust passage 30. Further, the CPU 72 uses the rotation speed NE and the charging efficiency η to calculate the temperature of the GPF 34. The CPU 72 uses the amount of PM in exhaust gas and/or the temperature of the GPF 34 to calculate the update amount ΔDPM.

Then, the CPU 72 updates the deposition amount DPM in correspondence with the update amount ΔDPM (S14). Subsequently, the CPU 72 determines whether a flag F is 1 (S16). When the flag F is 1, the flag F indicates that the regenerating process is being executed to burn and remove the PM in the GPF 34. When the flag F is 0, the flag F indicates that the regenerating process is not being executed to burn and remove the PM in the GPF 34. When determining that the flag F is 0 (S16: NO), the CPU 72 determines whether the deposition amount DPM is greater than or equal to a regeneration execution value DPMH (S18). The regeneration execution value DPMH is set to a value in which PM needs to be removed because the amount of PM trapped by the GPF 34 is large.

When determining that the deposition amount DPM is greater than or equal to the regeneration execution value DPMH (S18: YES), the CPU 72 determines whether the condition for executing the regenerating process is satisfied (S20). The execution condition simply needs to be a condition in which the logical conjunction of conditions (1) to (3) is true. That is, the execution condition is that conditions (1) to (3) are all satisfied.

Condition (1): An engine torque command value Te* (a command value of torque for the internal combustion engine 10) is greater than or equal to a specific value Teth.

Condition (2): The rotation speed NE of the internal combustion engine 10 is greater than or equal to a specific speed.

Condition (3): A torque compensation process of S24 is able to be executed.

When conditions (1) to (3) are all satisfied, that is, when the above-described execution condition is satisfied (S20: YES), the CPU 72 executes the regenerating process to substitute 1 into the flag F (S22). In other words, the CPU 72 deactivates the injection of fuel from the port injection valve 16 and the direct injection valve 22 of cylinder #1 and makes the air-fuel ratio of air-fuel mixture in the combustion chambers 20 of cylinders #2 to #4 richer than the stoichiometric air-fuel ratio. In this process, oxygen and unburned fuel are discharged to the exhaust passage 30 to increase the temperature of the GPF 34 so that the PM trapped by the GPF 34 is burned and removed. That is, this process causes oxygen and unburned fuel to be discharged to the exhaust passage 30 so as to burn the unburned fuel and thus increase the temperature of exhaust gas in the three-way catalyst 32, thereby increasing the temperature of the GPF 34. Additionally, the supply of oxygen into the GPF 34 allows the PM trapped by the GPF 34 to be burned and removed.

In addition, the CPU 72 executes a process that compensates for torque fluctuation of the crankshaft 26 of the internal combustion engine 10 resulting from the deactivation of the combustion control for cylinder #1 (S24). In this process, the CPU 72 superimposes a compensation torque on the torque of traveling requested for the second motor generator 54. The CPU 72 operates the inverter 58 using the requested torque on which the compensation torque is superimposed.

When determining that the flag F is 1 (S16: YES), the CPU 72 determines whether the deposition amount DPM is less than or equal to a deactivation threshold value DPML (S26). The deactivation threshold value DPML is set to a value in which the regenerating process is allowed to be deactivated because the amount of PM trapped by the GPF 34 is sufficiently small. When determining that the deposition amount DPM is less than or equal to the deactivation threshold value DPML (S26: YES), the CPU 72 deactivates the regenerating process and substitutes 0 into the flag F (S28).

When completing the process of S24, S28 or when making a negative determination in the process of S18, S20, the CPU 72 temporarily ends the series of processes shown in FIG. 2.

Figure 3:
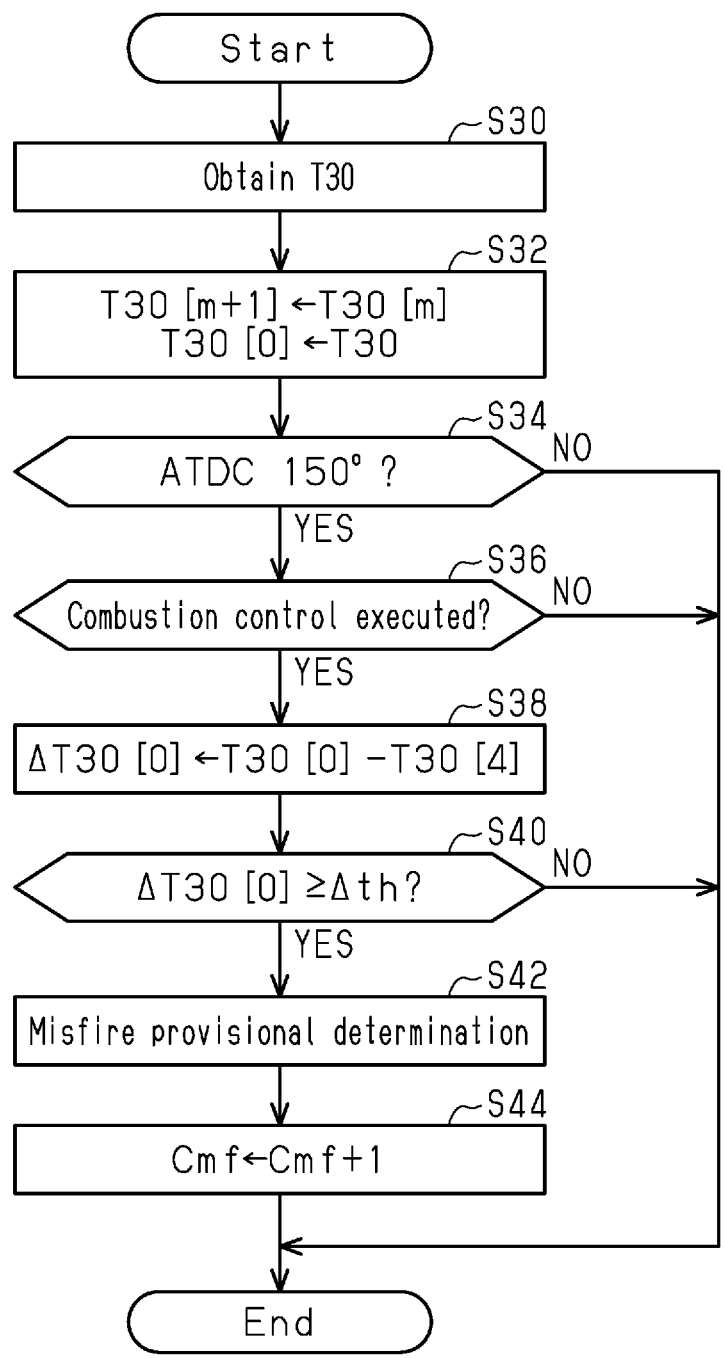
FIG. 3 is a flowchart showing a procedure related to the provisional determination process executed by the controller of the embodiment.

FIG. 3 illustrates a procedure of other processes executed by the controller 70. The processes shown in FIG. 3 are executed by the CPU 72 repeatedly executing programs stored in the ROM 74, for example, in a specific cycle.

In the series of processes shown in FIG. 3, the CPU 72 first obtains a time T30 for the crankshaft 26 to rotate by 30° CA (S30). The time T30 is calculated by the CPU 72 referring to the output signal Scr and counting the time for the crankshaft 26 to rotate by 30° CA. Next, the CPU 72 substitutes the time T30[$m$] into the time T30[$m+1$], where $m=0, 1, 2, 3, \ldots$, and substitutes, into the time T30[0], the time T30 that was newly obtained in the process of S30 and stores these times T30 in the memory device 75 (S32). This process is performed such that the variable in the parenthesis subsequent to the time T30 becomes larger the further back in time it represents. In a case where the value of the variable in the parenthesis is increased by one, the time T30 is counted at the previous 30° CA.

Subsequently, the CPU 72 determines whether the current rotation angle of the crankshaft 26 is after top dead center (ATDC) 150° CA with reference to the top dead center of one of cylinders #1 to #4 (S34). When determining that the current rotation angle of the crankshaft 26 is ATDC150° CA with reference to the top dead center of one of cylinders #1 to #4 (S34: YES), the CPU 72 determines whether combustion control has been executed in that cylinder (S36). In other words, the CPU 72 determines whether the combustion control is deactivated by the regenerating process.

When determining that the combustion control is determined as having been executed (S36: YES), the CPU 72 subjects the cylinder to determination of whether a misfire has occurred, and calculates a rotation fluctuation amount $\Delta$T30[0] of the cylinder subject to the determination (S38). More specifically, the CPU 72 subtracts the time T30[4] from the latest time T30[0]. In this context, T30[0] is the time required for the rotation by 30° CA from ATDC120° CA in the cylinder subject to the determination. Accordingly, in a case where a misfire has not occurred, the time T30[0] is smaller than the time T30[4] and thus the rotation fluctuation amount $\Delta$T30[0] is negative. In a case where a misfire has occurred, the rotation fluctuation amount $\Delta$T30[0] is positive.

Next, the CPU 72 determines whether the rotation fluctuation amount $\Delta$T30[0] is greater than or equal to a fluctuation amount threshold value $\Delta$th (S40). This process is performed to determine whether a misfire has occurred in the cylinder subject to the determination. For example, the CPU 72 may variably set the fluctuation amount threshold value $\Delta$th in correspondence with the rotation speed NE and the charging efficiency η. The parameter that defines the fluctuation amount threshold value $\Delta$th is not limited to the variable indicating load, such as the charging efficiency η, and the rotation speed NE. The parameter that defines the fluctuation amount threshold value $\Delta$th may be, for example, the sum of the previous rotation fluctuation amount $\Delta$T30 and a specific value. The previous rotation fluctuation amount $\Delta$T30 is an amount in a cylinder in which the point in time when the compression top dead center occurs is back in time by an integral multiple of 360° and in which combustion control is not deactivated. The specific value in this case may be variably set in correspondence with the load indicating load and/or the rotation speed NE.

When determining that the rotation fluctuation amount $\Delta$T30 is greater than or equal to the fluctuation amount threshold value $\Delta$th (S40: YES), the CPU 72 makes a provisional determination that a misfire has occurred (S42). Then, the CPU 72 increments a misfire counter Cmf (S44).

When completing the process of S44 or making a negative determination in the process of S34, S36, S40, the CPU 72 temporarily ends the series of processes shown in FIG. 3.

Figure 4:
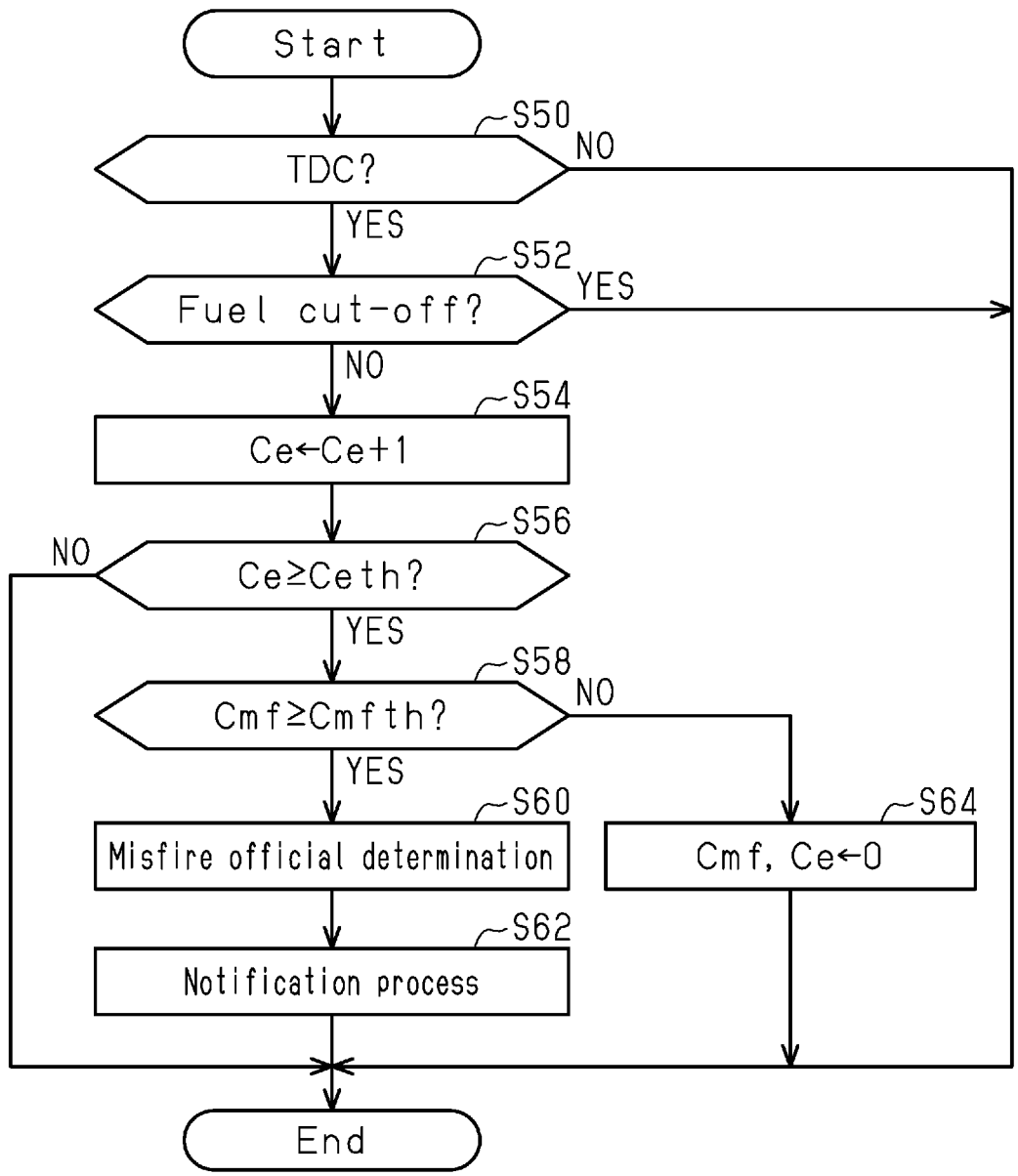
FIG. 4 is a flowchart showing a procedure related to the official determination process executed by the controller of the embodiment.

FIG. 4 shows a procedure of processes in which the misfire counter Cmf is used as an input. The processes shown in FIG. 4 are executed by the CPU 72 repeatedly executing programs stored in the ROM 74, for example, in a specific cycle.

In the series of processes shown in FIG. 4, the CPU 72 first determines whether one of cylinders #1 to #4 has reached its compression top dead center (S50). When determining that one of cylinders #1 to #4 has reached its compression top dead center (S50: YES), the CPU 72 determines whether the combustion control has been deactivated by the regenerating process in that cylinder (S52). In other words, the CPU 72 determines whether a fuel cut-off process has been executed. That is, the CPU 72 determines whether a deactivating process for combustion control has been executed. When determining that the combustion control has been executed (S52: NO), the CPU 72 increments a validity counter Ce (S54). Then, the CPU 72 determines whether the validity counter Ce is greater than or equal to a given value Ceth (S56)

When determining that the validity counter Ce is greater than or equal to the given value Ceth (S56: YES), the CPU 72 determines whether the misfire counter Cmf is greater than or equal to a determination threshold value Cmfth (S58). The determination threshold value Cmfth is set to a lower limit value in which the number of times a misfire has occurred is greater than an allowable range during a period in which the number of executions of combustion control reaches the given value Ceth. That is, in the present embodiment, the CPU 72 determines that the allowable range is exceeded when a misfire ratio is greater than or equal to Cmfth/Ceth. The misfire ratio refers to the number of times a misfire has occurred relative to the number of executions of combustion control. The ratio Cmfth/Ceth is set in correspondence with an upper limit value in which a fluid element discharged out of the vehicle through the exhaust passage 30 is not deviated from the allowable range.

When determining that the misfire counter Cmf is greater than or equal to the determination threshold value Cmfth (S58: YES), the CPU 72 makes an official determination that a misfire has occurred (S60). Then, the CPU 72 operates a warning light 100, which is shown in FIG. 1, to issue a notification indicating that a misfire has occurred (S62).

The official determination that a misfire has occurred indicates that the occurrence frequency of a misfire in the internal combustion engine 10 is greater than or equal to a specific frequency. That is, for example, a case in which a misfire occurs only once during a period in which the validity counter Ce reaches the given value Ceth is not subject to the notification process. That is, the determination that a misfire has occurred indicates that a misfire has occurred at a frequency that needs the execution of the notification process.

When determining that the misfire counter Cmf is less than the determination threshold value Cmfth (S58: NO), the CPU 72 initializes the misfire counter Cmf and the validity counter Ce (S64).

When completing the process of S62, S64, when making a negative determination in the process of S50, S56 or when making an affirmative determination in the process of S52, the CPU 72 temporarily ends the series of processes shown in FIG. 4.

The operation and advantages of the present embodiment will now be described.

When the deposition amount DPM becomes greater than or equal to the threshold value DPMth, the CPU 72 executes the regenerating process for the GPF 34. This allows the air drawn in the intake stroke of cylinder #1 to flow out to the exhaust passage 30 in the exhaust stroke of cylinder #1 without being burned. The air-fuel mixture of cylinders #2 to #4 is richer than the stoichiometric air-fuel ratio. Thus, the exhaust gas discharged from cylinders #2 to #4 to the exhaust passage 30 includes a vast amount of unburned fuel. The oxygen and unburned fuel discharged to the exhaust passage 30 increase the temperature of the GPF 34 by being burned in the three-way catalyst 32. The oxygen in the air that has flowed to the exhaust passage 30 oxidizes PM in the GPF 34. This burns and removes the PM.

When determining that the rotation fluctuation amount ΔT30[0] related to cylinder #4 is greater than or equal to the determination value Δth, the CPU 72 increments the misfire counter Cmf Every time a compression top dead center occurs, the CPU 72 determines whether to deactivate the combustion control through the regenerating process. When the CPU 72 does not deactivate the combustion control, the CPU 72 increments the validity counter Ce. Then, when the validity counter Ce reaches the given value Ceth and then the CPU 72 determines that the misfire counter Cmf is greater than or equal to the determination threshold value Cmfth, the CPU 72 makes the official determination that a misfire has occurred and issues a notification indicating the occurrence of the misfire.

The period in which the validity counter Ce reaches the given value Ceth is longer when the combustion control is deactivated a large number of times than when the combustion control is deactivated a small number of times. Thus, the number of rotations of the crankshaft 26 until an affirmative determination is made in the process of S56 is larger when the combustion control is deactivated a large number of times than when the combustion control is deactivated a small number of times. Accordingly, the value obtained by dividing the determination threshold value Cmfth by the number of rotations is larger when the combustion control is deactivated a large number of times than when the combustion control is deactivated a small number of times. That is, the frequency defined by the number of provisional determinations per specific number of rotations for making the official determination is lower when the combustion control is deactivated a large number of times than when the combustion control is deactivated a small number of times.

If a misfire is determined as having occurred in a case in which the misfire counter Cmf is greater than or equal to the determination threshold value Cmfth when the crankshaft 26 of the internal combustion engine 10 rotates a specific number of times, the number of executions of combustion control varies the misfire ratio, which is the ratio of the number of times a misfire has occurred to the number of times combustion control has been performed. This may result in a situation in which the official determination that a misfire has occurred is not made although the misfire ratio is Cmfth/Ceth. Further, in the case of changing the determination threshold value so as to avoid this situation, the official determination that a misfire ratio has occurred may be made although the misfire has not reached Cmfth/Ceth.

The validity counter Ce of the present embodiment indicates the number of times combustion control has been executed. Thus, in the present embodiment, the official determination that a misfire has occurred is made when the misfire ratio, which is the ratio of the number of times a misfire has occurred to the number of times combustion control has been performed, is greater than or equal to a specific value. The specific value is set to a fixed value, i.e., Cmfth/Ceth. Thus, regardless of how many times combustion control has been deactivated, the official determination is made through the regenerating process depending on whether the misfire ratio is greater than or equal to the specific value.

The above-described present embodiment further provides the following advantage.

(1) When determining in the process of S20 that the execution condition is not satisfied, the CPU 72 suspends the regenerating process even in the middle of the regenerating process. Thus, as compared with a case in which the regenerating process is permitted only when the regenerating process does not need to be suspended in the middle of the regenerating process, the regenerating process is executed more quickly but the number of times combustion control is deactivated in a specific period varies. Then, it is particularly effective to make the official determination that a misfire has occurred when the misfire counter Cmf is greater than or equal to the determination threshold value Cmfth during a period in which the validity counter Ce reaches the given value Ceth.

Second Embodiment

A second embodiment will now be described with reference to the drawings, focusing on the differences from the first embodiment.

Figure 5:
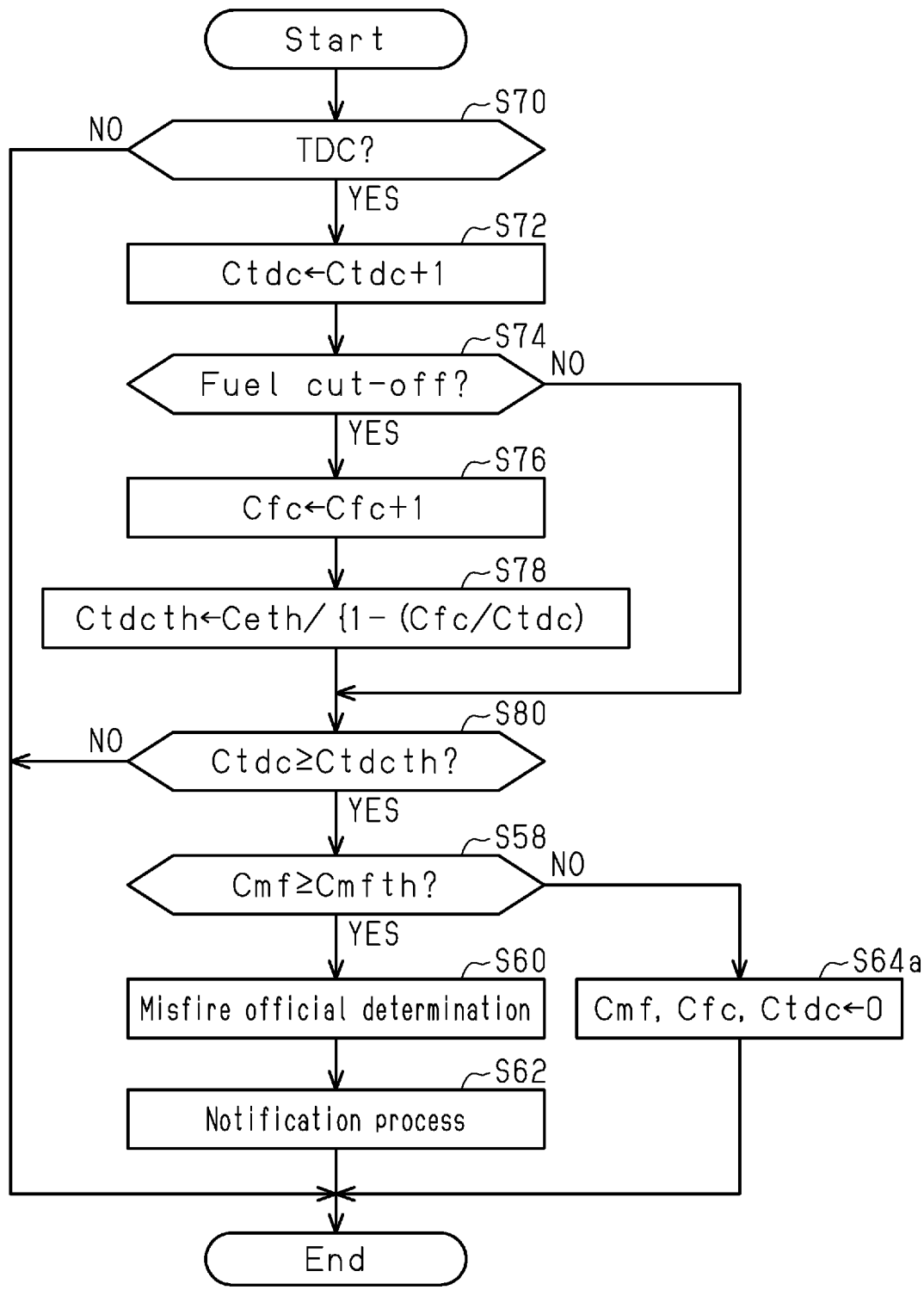
FIG. 5 is a flowchart showing a procedure related to the official determination process executed by the controller according to a second embodiment.

FIG. 5 shows a procedure of processes in which the value of the misfire counter Cmf of the present embodiment is used as an input. The processes shown in FIG. 5 are executed by the CPU 72 repeatedly executing programs stored in the ROM 74, for example, in a specific cycle. In FIG. 5, the same step numbers are given to the processes that correspond to those in FIG. 4.

In the series of processes shown in FIG. 5, the CPU 72 first determines whether one of cylinders #1 to #4 has reached its compression top dead center (S70). When determining that one of cylinders #1 to #4 has reached its compression top dead center (S70: YES), the CPU 72 increments a monitor counter Ctdc (S72). Next, the CPU 72 determines whether the combustion control is deactivated in that cylinder (S74). When determining that the combustion control is deactivated (S74: YES), the CPU 72 increments a deactivation counter Cfc (S76).

Subsequently, the CPU 72 corrects a monitor period threshold value Ctdcth in correspondence with the monitor counter Ctdc and the deactivation counter Cfc (S78). The monitor period threshold value Ctdcth defines the execution condition for the process of S58. That is, the CPU 72 substitutes, into the monitor period threshold value Ctdcth, a value obtained by dividing the given value Ceth by $1-(Cfc/Ctdc)$.

When completing the process of S78 or making a negative determination in the process of S74, the CPU 72 determines whether the monitor counter Ctdc is greater than or equal to the monitor period threshold value Ctdcth (S80). When determining that the monitor counter Ctdc is greater than or equal to the monitor period threshold value Ctdcth (S80: YES), the CPU 72 executes the process of S58. When making an affirmative determination in the process of S58, the CPU 72 executes the processes of S60, S62. When making a negative determination in the process of S58, the CPU 72 initializes the misfire counter Cmf, the deactivation counter Cfc, and the monitor counter Ctdc (S64a). When completing the process of S62, S64a or making a negative determination in the process of S70, S80, the CPU 72 temporarily ends the series of processes shown in FIG. 5.

The process of S78 is performed to set, to Cmfth/Cet, the misfire ratio obtained when the official determination that a misfire has occurred is made. That is, the number of times combustion control has been executed is a value obtained by subtracting the deactivation counter Cfc from the monitor counter Ctdc, namely, Ctdc−Cfc. The monitor counter Ctdc at the point in time when an affirmative determination is made in the process of S80 is $Ceth/\{1-(Cfc/Ctdc)\}$. That is, the following expression is satisfied.

$$Ctdc=Ceth/\{1-(Cfc/Ctdc)\}$$

Modification of the expression leads to Ctdc−Cfc=Ceth. Thus, the number of executions of combustion control at the point in time when the process of S80 was executed is equal to the given value Ceth. Accordingly, when an affirmative determination is made in the process of S58 at this point in time, the misfire ratio is Cmfth/Ceth.

In this manner, in the present embodiment, the point in time until the process of S58 is performed is retarded as the deactivation counter Cfc increases. Thus, regardless of how many times combustion control has been deactivated, the official determination can be performed depending on whether the misfire ratio is greater than or equal to Cmfth/Ceth.

Third Embodiment

A third embodiment will now be described with reference to the drawings, focusing on the differences from the first embodiment.

Figure 6:
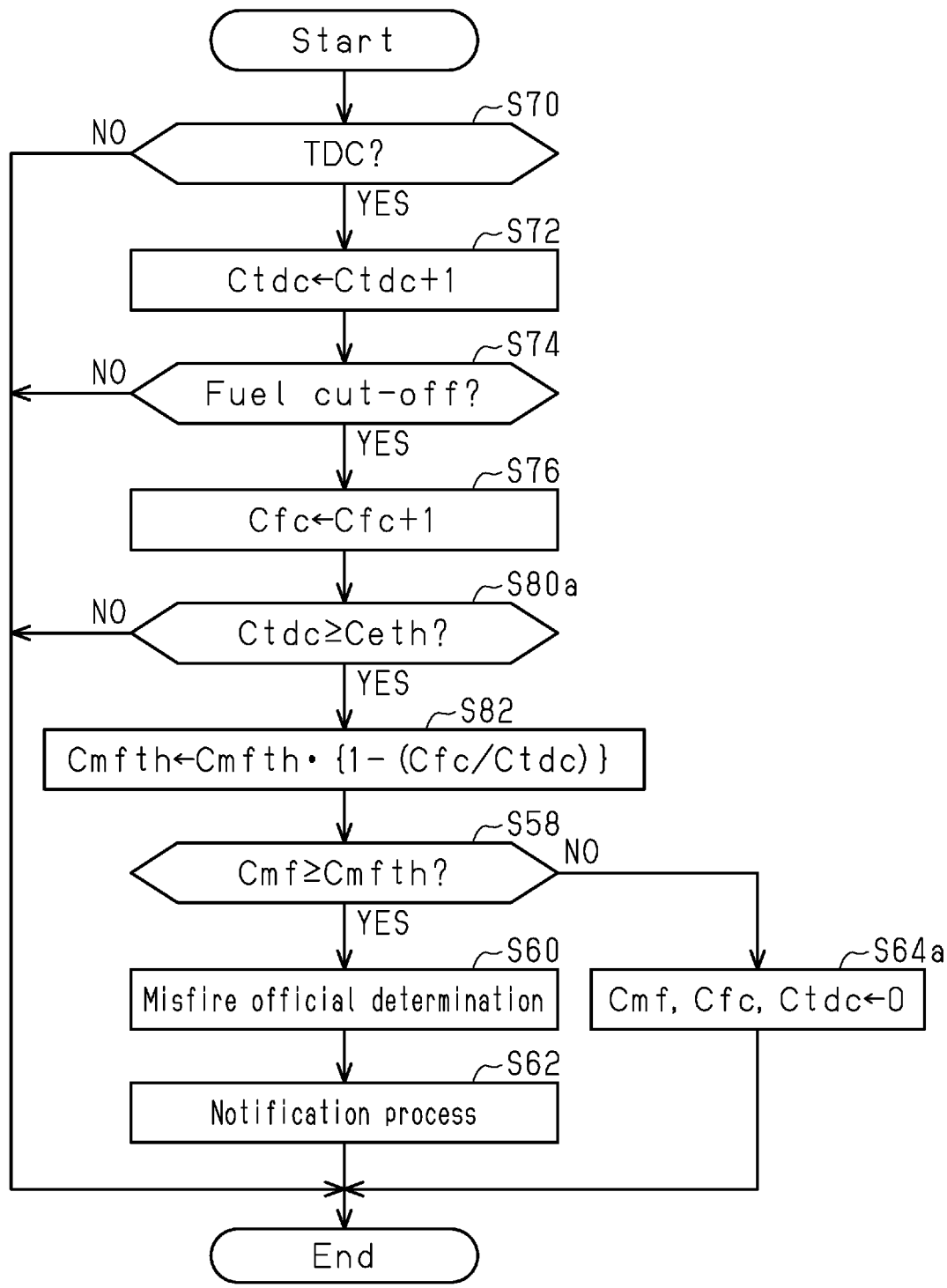
FIG. 6 is a flowchart showing a procedure related to the official determination process executed by the controller according to a third embodiment.

FIG. 6 shows a procedure of processes in which the value of the misfire counter Cmf of the present embodiment is used as an input. The processes shown in FIG. 6 are executed by the CPU 72 repeatedly executing programs stored in the ROM 74, for example, in a specific cycle. In FIG. 6, the same step numbers are given to the processes that correspond to those in FIGS. 4 and 5.

In the series of processes shown in FIG. 6, the CPU 72 executes the processes of S70 to S76 and determines whether the monitor counter Ctdc is greater than or equal to the given value Ceth (S80a). When making an affirmative determination in the process of S80a, the CPU 72 substitutes, into the determination threshold value Cmfth, a value obtained by multiplying the determination threshold value Cmfth by $1-(Cfc/Ctdc)$ (S82). Then, the CPU 72 proceeds to the process of S58.

In the process of S82, the lower limit value of a misfire frequency used to make the official determination that a misfire has occurred is set to Cmfth/Ceth using the determination threshold value Cmfth prior to being corrected. That is, the number of times combustion control has been executed at the point in time when the process of S58 is executed is a value obtained by subtracting the deactivation counter Cfc from the monitor counter Ctdc, namely, Ctdc−Cfc. At the point in time when an affirmative determination is made in the process of S80a, the monitor counter Ctdc matches the given value Ceth. Thus, the number of times combustion control has been executed is Ceth-Cfc. The determination threshold value corrected in the process of S82 is $Cmfth \cdot \{1-(Cfc/Ceth)\}$. Thus, the value obtained by dividing the corrected determination threshold value by the number of times combustion control has been executed is obtained using the determination threshold value Cmfth prior to being corrected as follows.

$$Cmfth \cdot \{1-(Cfc/Ceth)\}/(Ceth-Cfc)=Cmfth/Ceth$$

In this manner, in the present embodiment, the determination threshold value Cmfth is corrected in correspondence with the deactivation counter Cfc. Thus, regardless of how many times combustion control has been deactivated, the official determination can be performed depending on whether the misfire ratio is greater than or equal to Cmfth/Ceth.

Fourth Embodiment

A fourth embodiment will now be described with reference to the drawings, focusing on the differences from the first embodiment.

Figure 7:
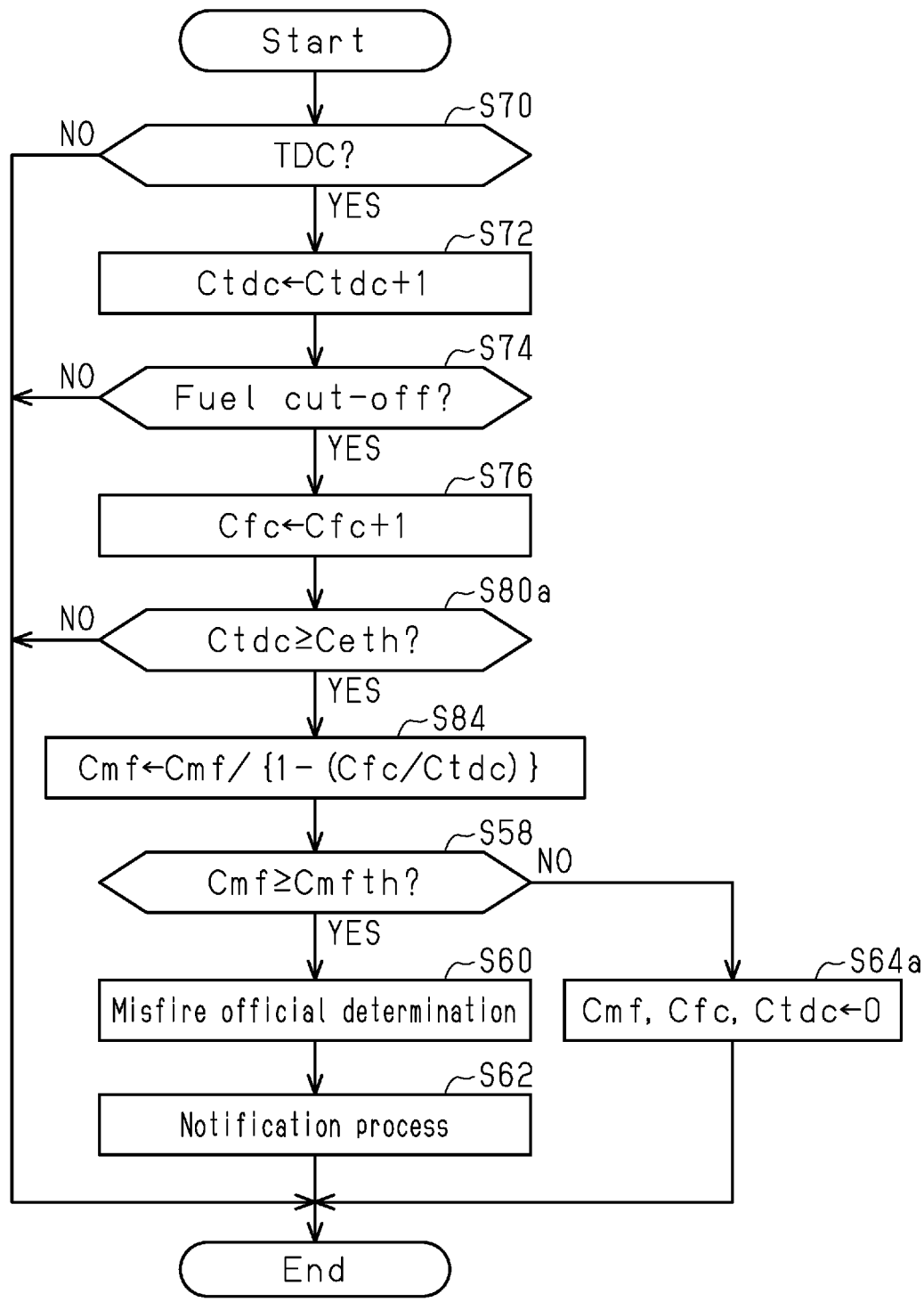
FIG. 7 is a flowchart showing a procedure related to the official determination process executed by the controller according to a fourth embodiment.

FIG. 7 shows a procedure of processes in which the value of the misfire counter Cmf of the present embodiment is used as an input. The processes shown in FIG. 7 are executed by the CPU 72 repeatedly executing programs stored in the ROM 74, for example, in a specific cycle. In FIG. 7, the same step numbers are given to the processes that correspond to those in FIGS. 4 to 6.

In the series of processes shown in FIG. 7, when performing the processes of S70 to S76, S80a and making an affirmative determination in the process of S80a, the CPU 72 substitutes, into the misfire counter Cmf, a value obtained by dividing the misfire counter Cmf by 1−(Cfc/Ctdc) (S84). Then, the CPU 72 proceeds to the process of S58.

In the process of S84, the lower limit value of a misfire frequency used to make the official determination that a misfire has occurred is set to Cmfth/Ceth. That is, at the point in time when the process of S58 is executed, the number of times combustion control has been executed is Ceth−Cfc. The misfire counter Cmf corrected in the process of S84 is, Cmf/{1−(Cfc/Ceth)}. At the point in time when an affirmative determination is made in the process of S58, the number of misfires is Cmfth·{1−(Cfc/Ceth)}. Thus, the value obtained by dividing the number of misfires by the number of times combustion control has been executed is as follows.

$$Cmfth·\{1-(Cfc/Ceth)\}/(Ceth-Cfc)=Cmfth/Ceth$$

In this manner, in the present embodiment, the misfire counter Cmf is corrected in correspondence with the deactivation counter Cfc. Thus, regardless of how many times combustion control has been deactivated, the official determination can be performed depending on whether the misfire ratio is greater than or equal to Cmfth/Ceth.

Correspondence

The correspondence between the items in the above-described embodiments and the items described in the above-described SUMMARY is as follows. In the following description, the correspondence is shown for each of the numbers described in the SUMMARY.

[Aspects 1, 2] The deactivating process corresponds to the process of S22. The provisional determination process corresponds to the processes of S40, S42. The provisional determination counting process corresponds to the process of S44. The official determination process corresponds to the processes of S50 to S60 in FIG. 4, the processes of S70 to S80, S58, S60 in FIG. 5, the processes of S70 to S76, S80a, S82, S58, S60 in FIG. 6, and the processes of S70 to S76, S80a, S84, S58, S60 in FIG. 7.

[Aspect 3] The extending process corresponds to the process of S56, S78.

[Aspect 4] The validity counting process corresponds to the process of S54. The specific period setting process corresponds to the process of S56.

[Aspect 5] The deactivation counting process corresponds to the process of S76.

[Aspect 6] The setting process corresponds to the process of S82.

[Aspect 7] The deactivation counting process corresponds to the process of S76.

[Aspect 8] The correcting process corresponds to the process of S84.

[Aspect 9] The deactivation counting process corresponds to the process of S76.

[Aspect 10] The filter corresponds to the GPF 34. The regenerating process corresponds to the process of S22. The specific condition corresponds to the execution condition in the process of S20.

Modifications

The present embodiment may be modified as follows. The above-described embodiment and the following modifications can be combined as long as the combined modifications remain technically consistent with each other.

Modification Related to Provisional Determination Process

In the above-described embodiments, the rotation fluctuation amount ΔT30 is set to the value obtained by subtracting, from the time T30[0] required for the rotation in the section between 120ATDC and 150ATDC, the time T30[4] required for the rotation in the section between TDC and 30ATDC. Instead, for example, the rotation fluctuation amount ΔT30 may be set to a value obtained by subtracting, from the time T30 required for the rotation of a section between TDC and 30ATDC of a cylinder subject to the determination of a misfire, the time T30 required for the rotation of a section between TDC and 30ATDC of the cylinder that reached its compression top dead center lastly.

In the above-described embodiments, the rotation fluctuation amount, which is the fluctuation amount of the rotation speed of the crankshaft 26 in the rotation angle interval that is less than or equal to the occurrence interval of a compression top dead center, is quantified using the difference between the times required for the rotation of the rotation angle interval. Instead, the rotation fluctuation amount may be quantified using a ratio.

In the above-described embodiments, the instantaneous speed variable, which is a variable that is used to define the rotation fluctuation amount and indicates the rotation speed of the crankshaft 26 in the rotation angle interval that is less than or equal to the occurrence interval of a compression top dead center, is quantified using the difference between the times required for the rotation of the rotation angle interval. Instead, the rotation fluctuation amount may be quantified using a speed.

The provisional determination process is not limited to a process that includes the rotation behavior of the crankshaft 26 as an input and outputs a logical value corresponding to whether a misfire has occurred. For example, an in-cylinder pressure sensor that detects the pressure in the combustion chamber 20 may be provided. In this case, a process that outputs a logical value corresponding to whether a misfire has occurred is performed in reference to the behavior at the detection value of the in-cylinder pressure sensor.

Modification Related to Provisional Determination Counting Process

In the above-described embodiments, every time a misfire provisional determination has been made, the misfire counter Cmf is incremented in the process of S44. However, this configuration does not have to be employed. In other words, the number of times a logical value indicating that an affirmative determination is made in the process of S40 does not have to be counted. For example, a counter may be provided to count the number of times a logical value indicating that a negative determination is made in the process of S40. In other words, the number of provisional determinations of normal combustion may be counted instead of a misfire provisional determination. In this case, the process of S58 is replaced with a process that determines whether the value of the counter is less than a specific value. Further, in the process of S82, a value compared with the value of the counter is corrected and increased. Furthermore, in the process of S84, the value of the counter is corrected and decreased.

Modification Related to Official Determination Process

In the process of FIG. 4, during the period in which the validity counter Ce reaches the given value Ceth, the official determination is made to indicate that a misfire has occurred when the number of times a misfire has occurred is greater than or equal to a specific number of times. Instead, for example, during the period in which the validity counter Ce reaches the given value Ceth, the official determination may be made to indicate that a misfire has continuously occurred in one cylinder when the number of times a misfire has occurred in one cylinder is greater than or equal to a specific number of times. In this case, each cylinder includes the misfire counter Cmf and the validity counter Ce. Thus, for example, the process of S50 in FIG. 4 determines whether the top dead center of a subject cylinder is reached.

In the process of FIG. 5, the monitor period threshold value Ctdcth is corrected using a value obtained by dividing, by the value of the monitor counter Ctdc, the value of the deactivation counter Cfc that counts the number of times the deactivating process has been executed. However, this configuration does not have to be employed. Instead, even if the monitor counter Ctdc is not provided, a value corresponding to the monitor counter Ctdc is able to be gained using a value obtained by multiplying a proportional coefficient by an integration value of the rotation speed. Thus, the monitor period threshold value Ctdcth may be corrected using a value obtained by dividing the deactivation counter Cfc by the multiplied value.

The deactivation counter Cfc used in the process of FIG. 5 does not have to be used. For example, when the deactivating process for combustion control is always executed every time in one cylinder, the monitor period threshold value Ctdcth may be corrected by dividing the monitor period threshold value Ctdcth by three-fourths.

In the process of FIG. 5, during the period in which the monitor counter Ctdc reaches the monitor period threshold value Ctdcth, the official determination is made to indicate that a misfire has occurred when the number of times a misfire has occurred is greater than or equal to a specific number of times. Instead, for example, during the period in which the monitor counter Ctdc reaches the monitor period threshold value Ctdcth, the official determination may be made to indicate that a misfire has continuously occurred in one cylinder when the number of times a misfire has occurred in one cylinder is greater than or equal to a specific number of times. In this case, each cylinder includes the misfire counter Cmf and the deactivation counter Cfc, and the value of the monitor period threshold value Ctdcth is adjusted for one cylinder. Thus, for example, the process of S70 in FIG. 5 determines whether the top dead center of a subject cylinder is reached.

In the process of FIG. 6, the determination threshold value Cmfth is corrected using a value obtained by dividing, by the value of the monitor counter Ctdc, the value of the deactivation counter Cfc that counts the number of times the deactivating process has been executed. However, this configuration does not have to be employed. Instead, even if the monitor counter Ctdc is not provided, a value corresponding to the monitor counter Ctdc is able to be gained using a value obtained by multiplying a proportional coefficient by an integration value of the rotation speed. Thus, the determination threshold value Cmfth may be corrected using a value obtained by dividing the deactivation counter Cfc by the multiplied value.

In the process of FIG. 6, during the period in which the monitor counter Ctdc reaches the monitor period threshold value Ctdcth, the official determination is made to indicate that a misfire has occurred when the number of times a misfire has occurred is greater than or equal to a specific number of times. Instead, for example, during the period in which the monitor counter Ctdc reaches the monitor period threshold value Ctdcth, the official determination may be made to indicate that a misfire has continuously occurred in one cylinder when the number of times a misfire has occurred in one cylinder is greater than or equal to a specific number of times. In this case, each cylinder includes the misfire counter Cmf and the deactivation counter Cfc, and the value of the monitor period threshold value Ctdcth is adjusted for one cylinder. Thus, for example, the process of S70 in FIG. 6 determines whether the top dead center of a subject cylinder is reached.

The deactivation counter Cfc used in the process of FIG. 6 does not have to be used. For example, when the deactivating process for combustion control is always executed every time in one cylinder, the determination threshold value Cmfth may be corrected by multiplying the determination threshold value Cmfth by three-fourths.

In the process of FIG. 7, the value of the misfire counter Cmf is corrected using a value obtained by dividing, by the value of the monitor counter Ctdc, the value of the deactivation counter Cfc that counts the number of times the deactivating process has been executed. However, this configuration does not have to be employed. Instead, even if the monitor counter Ctdc is not provided, a value corresponding to the monitor counter Ctdc is able to be gained using a value obtained by multiplying a proportional coefficient by an integration value of the rotation speed. Thus, the misfire counter Cmf may be corrected using a value obtained by dividing the deactivation counter Cfc by the multiplied value.

The deactivation counter Cfc used in the process of FIG. 7 does not have to be used. For example, when the deactivating process for combustion control is always executed every time in one cylinder, the value of the misfire counter Cmf may be corrected by dividing the value of the misfire counter Cmf by three-fourths.

In the process of FIG. 7, during the period in which the monitor counter Ctdc reaches the monitor period threshold value Ctdcth, the official determination is made to indicate that a misfire has occurred when the number of times a misfire has occurred is greater than or equal to a specific number of times. Instead, for example, during the period in which the monitor counter Ctdc reaches the monitor period threshold value Ctdcth, the official determination may be made to indicate that a misfire has continuously occurred in one cylinder when the number of times a misfire has occurred in one cylinder is greater than or equal to a specific number of times. In this case, each cylinder includes the misfire counter Cmf and the deactivation counter Cfc, and the value of the monitor period threshold value Ctdcth is adjusted for one cylinder. Thus, for example, the process of S70 in FIG. 7 determines whether the top dead center of a subject cylinder is reached.

The official determination process is not limited to a process that makes the official determination that a misfire has occurred only when the misfire counter Cmf is greater than or equal to the determination threshold value Cmfth. The official determination process may also include, for example, a process based on the comparison of the pattern of misfire with the waveform of rotation of the crankshaft.

Modification Related to Specific Condition that Permits Execution of Regenerating Process The specific condition that permits the execution of the regenerating process is not limited to the ones in the above-described embodiments. For example, the specific condition may include only two or one of the above-described three conditions (1) to (3). Alternatively, the specific condition may include a condition other than the above-described three conditions or does not have to include any one of the three conditions.

Modification Related to Deactivating Process

The deactivating process is not limited to the regenerating process. For example, the deactivating process may deactivate the supply of fuel in one or some of the cylinders in order to adjust the output of the internal combustion engine 10. Instead, when an anomaly occurs in one or some of the cylinders, a process may be performed to deactivate combustion control in the cylinder. Alternatively, when the oxygen absorption amount of the three-way catalyst 32 is less than or equal to a given value, a process may be performed to deactivate combustion control only in one or some of the cylinders and execute control that sets the air-fuel ratio of air-fuel mixture in the remaining cylinders to the stoichiometric air-fuel ratio.

Modification Related to Reflection of Misfire Determination Result

In the above-described embodiments, when misfire has been determined as having occurred, the notification process using the warning light 100 is executed. The notification process is not limited to the process in which a device that outputs visual information is subject to operation, and may be, for example, a process in which a device that outputs auditory information is subject to operation.

The misfire determination result does not necessarily have to be used for the notification process. For example, when a misfire occurs, a process may be executed to operate the operation units of the internal combustion engine 10 such that the control of the internal combustion engine 10 is changed to an operating state in which a misfire does not easily occur.

Modification Related to Estimation of Deposition Amount

The process that estimates the deposition amount DPM is not limited to the one illustrated in FIG. 2. Instead, for example, the deposition amount DPM may be estimated using the intake air amount Ga and the pressure difference between the upstream side and the downstream side of the GPF 34. More specifically, the deposition amount DPM simply needs to be estimated to be a larger value when the pressure difference is large than when the pressure difference is small. Even when the pressure difference is the same, the deposition amount DPM simply needs to be estimated to be a larger value when the intake air amount Ga is small than when the intake air amount Ga is large. If the pressure in the downstream side of the GPF 34 is regarded as a fixed value, the pressure Pex may be used instead of the pressure difference.

Modification Related to Aftertreatment Device

The GPF 34 is not limited to the filter supported by the three-way catalyst and may be only the filter. Further, the GPF 34 does not have to be located on the downstream side of the three-way catalyst 32 in the exhaust passage 30. Furthermore, the aftertreatment device does not necessarily have to include the GPF 34. For example, when the aftertreatment device includes only the three-way catalyst 32, the execution of the processes illustrated in the above-described embodiments and the modifications is effective in a case where aftertreatment device needs to be heated during the regeneration process.

Modification Related to Controller 70

The controller 70 is not limited to a device that includes the CPU 72 and the ROM 74 and executes software processing. For example, at least part of the processes executed by the software in the above-described embodiments may be executed by hardware circuits dedicated to executing these processes (such as ASIC). That is, the controller 70 may be modified as long as it has any one of the following configurations (a) to (c): (a) a configuration including a processor that executes all of the above-described processes according to programs and a program storage device such as a ROM that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. A plurality of software execution devices each including a processor and a program storage device and a plurality of dedicated hardware circuits may be provided.

Modification Related to Vehicle

The vehicle is not limited to a series-parallel hybrid vehicle and may be, for example, a parallel hybrid vehicle or a series-parallel hybrid vehicle. The hybrid vehicle may be replaced with, for example, a vehicle in which only the internal combustion engine 10 is used as a power generation device for the vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A misfire detection device for an internal combustion engine, the internal combustion engine including a sensor and cylinders, wherein the misfire detection device is configured to execute:
 a deactivating process that deactivates combustion control for air-fuel mixture in one or some of the cylinders;
 a provisional determination process that uses a detection value of the sensor to output a logical value indicating whether a misfire has occurred;
 a provisional determination counting process that counts a number of times a specific one of the logical value output by the provisional determination counting process has been output; and
 an official determination process that makes an official determination of whether the misfire has occurred using, as an input, the number of times counted by the provisional determination counting process during a specific period, a length of the specific period is defined by a number of rotations of a crankshaft of the internal combustion engine, the official determination process includes a process that makes the official determination that the misfire has occurred even in a case where a frequency at which the provisional determination of the misfire has been made in the specific period is lower when the deactivating process is executed in the specific period than when the deactivating process is not executed in the specific period, and the frequency at which the provisional determination of the misfire has been made in the specific period is a value obtained by dividing a number of times the provisional determination has been made by the number of rotations of the crankshaft in the specific period.

2. The misfire detection device according to claim 1, wherein the official determination process includes a process that makes the official determination that the misfire has occurred even in the case where the frequency at which the provisional determination of the misfire has been made in the specific period is lower when the deactivating process is executed in the specific period a large number of times than when the deactivating process is executed in the specific period a small number of times.

3. The misfire detection device according to claim 1, wherein the official determination process includes, as an input, the number of times counted by the provisional determination counting process during the specific period and makes the official determination that the misfire has occurred when the number of times the provisional determination has been made is greater than or equal to a determination threshold value, and the official determination process includes an extending process that sets the specific period to be longer when the deactivating process is executed than when the deactivating process is not executed.

4. The misfire detection device according to claim 3, wherein the official determination process includes a validity counting process that monitors whether the combustion control is executed in an occurrence cycle of a compression top dead center and counts a number of times the combustion control is executed when the combustion control is executed, and the extending process includes a specific period setting process that sets the specific period to a period in which a valid number of times reaches a given value, the valid number of times referring to the number of times counted by the validity counting process.

5. The misfire detection device according to claim 3, wherein the official determination process includes a deactivation counting process that monitors whether the deactivating process is executed in an occurrence cycle of a compression top dead center and counts a number of times the deactivating process has been executed, and the extending process increases an extension amount of the specific period as the number of times counted by the deactivation counting process increases.

6. The misfire detection device according to claim 1, wherein the official determination process includes, as an input, the number of times counted by the provisional determination counting process during the specific period and makes the official determination that the misfire has occurred when the number of times the provisional determination has been made is greater than or equal to a determination threshold value, and the official determination process includes a setting process that sets the determination threshold value to be smaller when the deactivating process is executed in the specific period than when the deactivating process is not executed in the specific period.

7. The misfire detection device according to claim 6, wherein the official determination process includes a deactivation counting process that monitors whether the deactivating process is executed in an occurrence cycle of a compression top dead center and counts a number of times the deactivating process has been executed, and the setting process includes a result of counting the deactivation counting process as an input and decreases the determination threshold value as the number of times the deactivating process has been executed becomes larger.

8. The misfire detection device according to claim 1, wherein the official determination process includes, as an input, the number of times counted by the provisional determination counting process during the specific period and makes the official determination that the misfire has occurred when the number of times the provisional determination has been made is greater than or equal to a determination threshold value, and the official determination process includes a correcting process that corrects the number of times counted by the provisional determination counting process such that the number of times the provisional determination of the misfire has been made increases when the deactivating process is executed in the specific period.

9. The misfire detection device according to claim 8, wherein the official determination process includes a deactivation counting process that monitors whether the deactivating process is executed in an occurrence cycle of a compression top dead center and counts a number of times the deactivating process has been executed, and the correcting process corrects the number of times counted by the provisional determination counting process such that the number of times the provisional determination of the misfire has been made increases as the number of times counted by the deactivation counting process increases.

10. The misfire detection device according to claim 2, wherein the internal combustion engine includes a filter that traps particulate matter in exhaust gas in an exhaust passage, and the misfire detection device is configured to execute:
a regenerating process including the deactivating process and a process that sets an air-fuel ratio in a cylinder that differs from the one or some of the cylinders to be richer than a stoichiometric air-fuel ratio when an amount of the particulate matter trapped by the filter is greater than or equal to a specific amount; and a process that suspends the regenerating process in a case in which a specific condition is not satisfied after starting executing the regenerating process.

11. A misfire detection method for an internal combustion engine, the internal combustion engine including a sensor and cylinders, the method comprising:

a deactivating process that deactivates combustion control for air-fuel mixture in one or some of the cylinders;

a provisional determination process that uses a detection value of the sensor to output a logical value indicating whether a misfire has occurred;

a provisional determination counting process that counts a number of times a specific one of the logical value output by the provisional determination counting process has been output; and an official determination process that makes an official determination of whether the misfire has occurred using, as an input, the number of times counted by the provisional determination counting process during a specific period, wherein a length of the specific period is defined by a number of rotations of a crankshaft of the internal combustion engine, the official determination process includes a process that makes the official determination that the misfire has occurred even in a case where a frequency at which the provisional determination of the misfire has been made in the specific period is lower when the deactivating process is executed in the specific period than when the deactivating process is not executed in the specific period, and the frequency at which the provisional determination of the misfire has been made in the specific period is a value obtained by dividing a number of times the provisional determination has been made by the number of rotations of the crankshaft in the specific period.

* * * * *